(12) United States Patent
Fanton

(10) Patent No.: US 9,976,891 B1
(45) Date of Patent: May 22, 2018

(54) MEASURING DISPENSER

(71) Applicant: Darren Adrian Fanton, Los Angeles, CA (US)

(72) Inventor: Darren Adrian Fanton, Los Angeles, CA (US)

(*) Notice: Subject to any disclaimer, the term of this patent is extended or adjusted under 35 U.S.C. 154(b) by 164 days.

(21) Appl. No.: 14/846,809

(22) Filed: Sep. 6, 2015

Related U.S. Application Data

(63) Continuation of application No. 14/313,406, filed on Jun. 24, 2014.

(60) Provisional application No. 61/839,811, filed on Jun. 26, 2013, provisional application No. 61/912,399, filed on Dec. 5, 2013.

(51) Int. Cl.
   *G01F 11/42* (2006.01)

(52) U.S. Cl.
   CPC .................... *G01F 11/42* (2013.01)

(58) Field of Classification Search
   CPC .......... G01F 11/24; G01F 11/42; G01F 11/46; G07F 11/50; G07F 11/52; G07F 11/54; A61J 7/04
   USPC ............ 222/452, 142.9, 370, 427, 430, 450; 221/203, 265, 119–121
   See application file for complete search history.

(56) References Cited

U.S. PATENT DOCUMENTS

| | | | |
|---|---|---|---|
| 2,385,677 A | 4/1944 | Bailey | |
| 2,584,781 A | 2/1952 | Beatty | |
| 2,877,937 A | 3/1959 | Weir | |
| 2,898,010 A | 8/1959 | Tepper | |
| 2,901,150 A | 8/1959 | Matter | |
| 3,269,612 A | 8/1966 | Bode | |
| 3,308,995 A | 3/1967 | Lee | |
| 3,450,310 A | 6/1969 | Dayton | |
| 3,695,487 A | 10/1972 | Slayton | |
| 3,754,688 A | 8/1973 | Colvin | |
| 4,071,171 A | 1/1978 | Bassignani | |
| 4,380,307 A | 4/1983 | Stillinger | |
| 4,429,815 A | 2/1984 | Libit | |
| 4,832,235 A | 5/1989 | Palmer | |
| 4,957,219 A | 9/1990 | Robbins | |
| 5,934,516 A | 8/1999 | Strycharski | |
| 6,283,339 B1 | 9/2001 | Morrow | |
| 6,550,640 B2 | 4/2003 | Smith | |
| 7,959,031 B2 | 1/2011 | Ranney | |
| 2007/0000953 A1* | 1/2007 | Ranney | G01F 11/261 222/450 |

* cited by examiner

*Primary Examiner* — Frederick C Nicolas
*Assistant Examiner* — Robert Nichols, II
(74) *Attorney, Agent, or Firm* — T. H. P. Richardson

(57) ABSTRACT

A device for dispensing spices and similar materials. The device includes a chamber member, an inner gate above the chamber member and an outer gate below the chamber member. The inner gate contains a filling aperture and the outer gate contains a dispensing aperture which is offset from the filling aperture. The chamber member contains dispensing chambers, each having an open top and an open base, and a non-dispensing chamber having a closed top. The inner and outer gates are linked together and can be rotated relative to the chamber member, so that material can be loaded through the filling aperture or dispensed through the dispensing aperture.

16 Claims, 7 Drawing Sheets

FIG 2
FIG 3
FIG 4
FIG 5
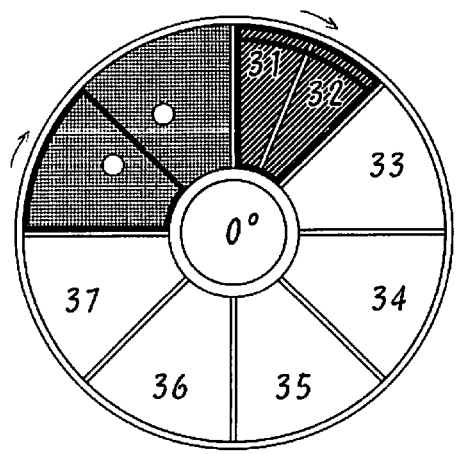
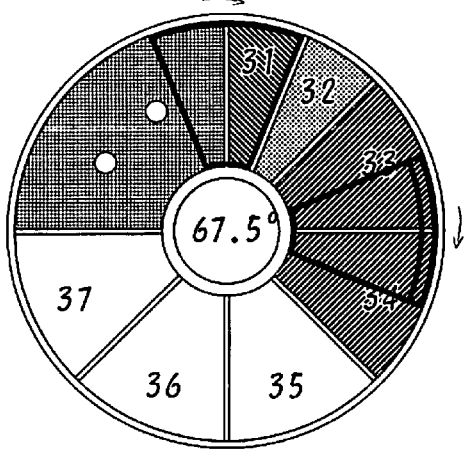
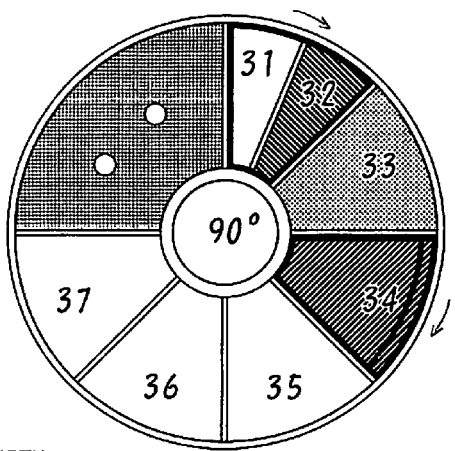
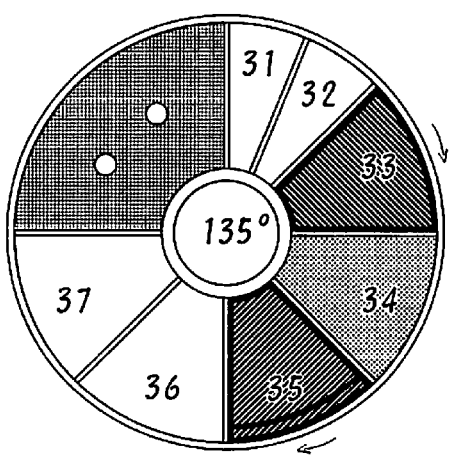
□ – EMPTY
▨ – FILLING
▦ – FULL
▧ – DISPENSING
▦ – DESSICANT CHAMBER
DISPENSING APERTURE –
FILLING APERTURE –

☐ -EMPTY
▨ -FILLING
▦ -FULL
▨ -DISPENSING
▦ -DESSICANT CHAMBER

DISPENSING APERTURE-
FILLING APERTURE-

☐ - EMPTY
▨ - FILLING
▩ - FULL
▧ - DISPENSING
▦ - DESSICANT CHAMBER

DISPENSING APERTURE -
FILLING APERTURE -

□ -EMPTY
▨ -FILLING
▦ -FULL
▩ -DISPENSING
▤ -DESSICANT CHAMBER

DISPENSING APERTURE-
FILLING APERTURE-

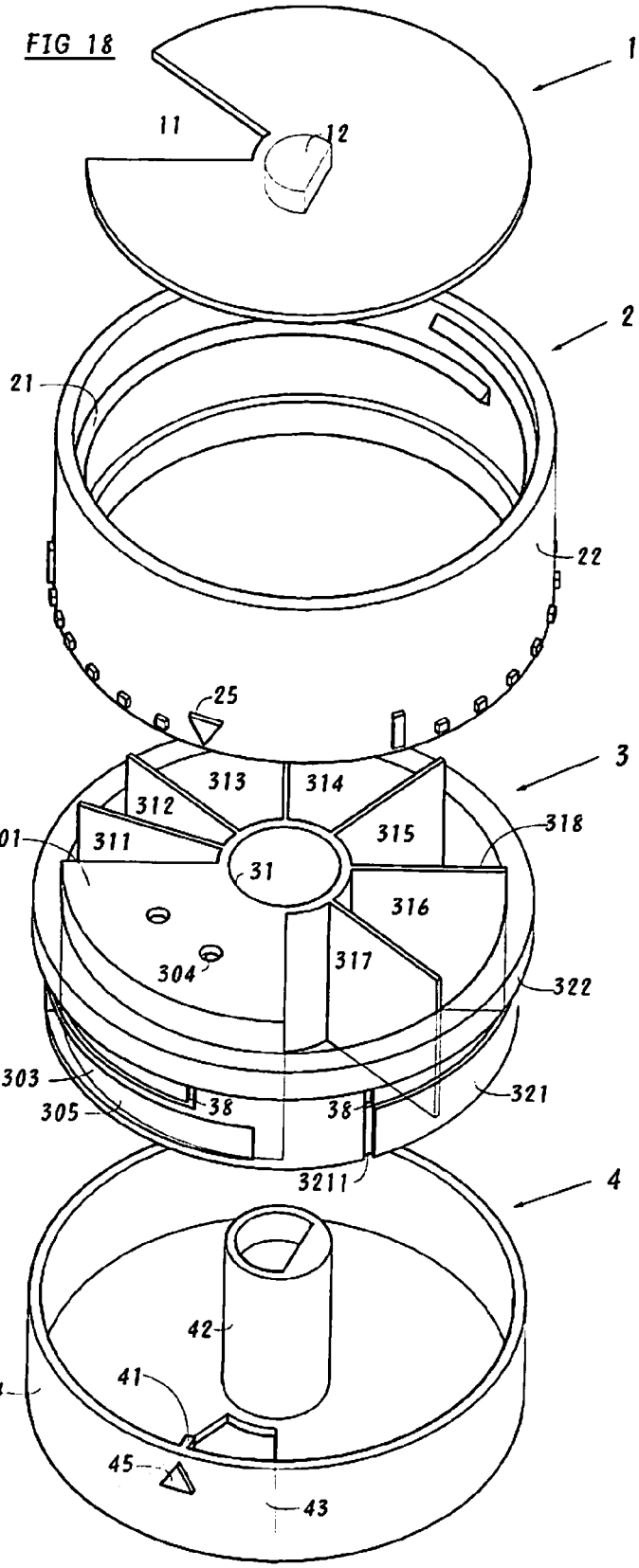

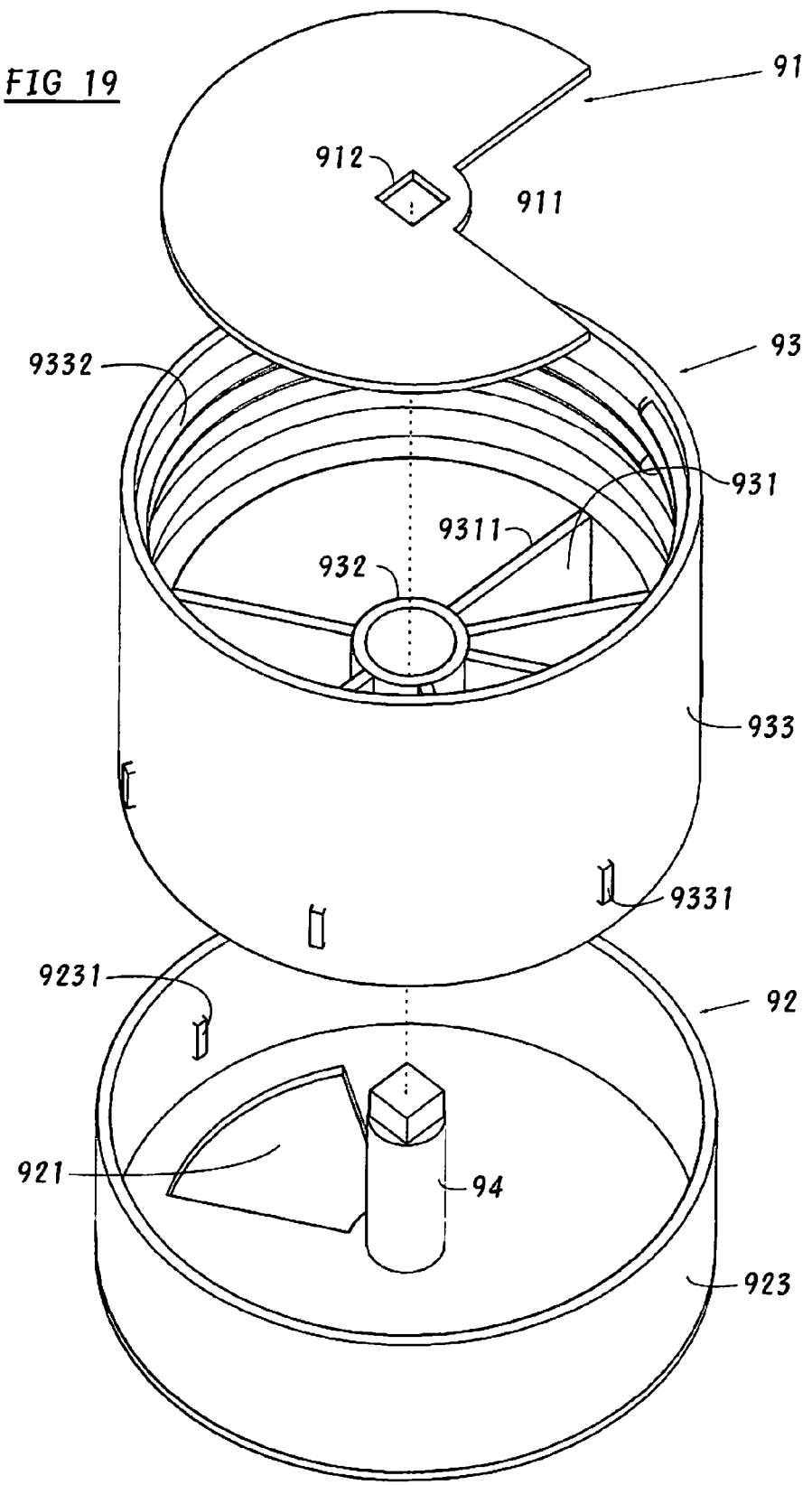

MEASURING DISPENSER

RELATED APPLICATIONS

This application is a continuation of application Ser. No. 14/313,406, filed Jun. 24, 2014. Application Ser. No. 14/313,406 claims priority from provisional application No. 61/839,811, filed Jun. 26, 2013, and provisional application No. 61/912,399, filed Dec. 5, 2013. The entire disclosure of each of those earlier applications is incorporated herein by reference. This application claims priority from each of applications Ser. Nos. 14/313,406, 61/839,811 and 61/912,399.

FIELD OF THE INVENTION

This invention relates to devices for dispensing measured amounts of materials.

BACKGROUND OF THE INVENTION

A number of devices for dispensing measured amounts of materials are known. Reference may be made, for example, to U.S. Pat. Nos. 2,385,677, 2,877,937, 2,898,010, 2,901,150, 3,450,310, 3,695,487, 3,754,688, 4,071,171, 4,429,815, 4,380,307, 4,832,235, 4,957,219, 6,283,339 and 7,959,031. The entire disclosure of each of those patents is incorporated herein by reference for all purposes.

SUMMARY OF THE INVENTION

This invention provides a device which dispenses a desired volume of material by opening one, or sequentially two or more, of three or more separate, previously loaded, dispensing chambers, the volume of the one dispensing chamber or the combined volumes of the two or more dispensing chambers which are opened being the desired volume of material to be dispensed. The device can be used to dispense any material which can be loaded into the dispensing chambers. The invention is particularly useful for dispensing materials which are in a container to which the device can be mounted. The materials which can be dispensed include finely comminuted and loose granular materials, e.g. spices, sugar, sugar substitutes, flour, protein powders, powdered coffee and chemicals, and liquids, for example cooking oils and liquid extracts, for example vanilla extract.

The device can be manually operated by an individual, or can be part of an automated system. The description below is principally directed to a measuring dispenser which is manually operated by an individual or by a robot, in which an exterior part of the device is subject to physical forces which result in the desired dispensing of the materials. However, the device could be operated remotely as part of a manufacturing process, with the operation of the device being controlled by components which are built into the device and which are controlled, for example, by an electrical and/or electronic control system If the container for the material to be dispensed is being stored with the device attached to it, the device can be mounted so that it is either below or above the container, When the material is being loaded into the dispensing chambers, and when the material is being dispensed from the dispensing chambers, the device is below the container, and the material is dispensed through the bottom of the device.

Where reference is made in this specification to an upper or lower part of the device, or to a part of the device being above or below another part of the device, or to viewing the device from on top or from underneath, or to a part of the device being vertical or horizontal, the reference is to the device when it is mounted on a container and is vertically below the container.

In a first aspect, this invention provides a device for dispensing material, the device comprising
(1) an inner (or upper) gate which contains a filling aperture,
(2) an outer (or lower) gate which
  (i) contains a dispensing aperture which is offset from the filling aperture,
  (ii) is below the inner gate and
  (iii) is linked to the inner gate so that movement of one of the inner gate and the outer gate results in corresponding movement of the other gate, and
(3) a chamber member which
  (i) is sandwiched between the inner gate and the outer gate,
  (ii) comprises
    (a) at least three separate contiguous dispensing chambers, each of the dispensing chambers having (i) a top, for example a completely open top, through which the material can be filled into the dispensing chamber and which can be placed under the filling aperture at a first location, and (ii) a base, for example a completely open base, through which material can be dispensed when the dispensing chamber contains the material, and which can be placed over the dispensing aperture at a second and different location, and
    (b) at least one non-dispensing chamber having an upper surface such that the material to be dispensed cannot be placed in it, for example, a continuous upper surface
  the inner gate and the outer gate being movable in relation to the chamber member between
    (a) a starting position at which the filling aperture is above the first dispensing chamber, and optionally over the first two dispensing chambers,
    (b) a succession of filling positions in each of which the filling aperture of the inner gate is above of one or more of the dispensing chambers and the dispensing aperture of the outer gate is not below that dispensing chamber, and
    (c) a succession of dispensing positions in each of which the filling aperture is not above any of the dispensing chambers, and the dispensing aperture of the outer gate is successively below one of the dispensing chambers.

Any controlled relative movement of (a) the inner and outer gates and (b) the chamber member is possible, but preferably the different parts of the device to have a generally circular cross-section when viewed from on top, and the relative movement is rotation around a central axis. Thus, the devices of the invention preferably comprise (1) an inner gate in the form of a disk having the filling aperture therein, (2) an outer gate in the form of a disk having the dispensing aperture therein, (3) a chamber member which comprises an outer cylindrical wall, a central member, a plurality of chamber walls which extend between the central member and the outer cylindrical wall and which define the dispensing chambers and the non-dispensing chamber.

In one embodiment, the central member is hollow, and the device comprises (4) a post which extends through the hollow central member and links the inner gate and the outer gate together so that rotation of one of the inner gate and the outer gate results in corresponding rotation of the other gate.

In the remainder of the specification, the invention will frequently be described hereinafter with reference to a device having those preferred features. However, those skilled in the art will recognize that the benefits of the invention can be provided by similar devices which do not have all or some of these preferred features. For example, the outer and inner gates can be linked to each other by one or more vertical members which are outside the chamber member, for example a cylindrical wall member.

In use of the device, the first step is to place the device on top of the container containing the material to be dispensed and to secure the device to the container so that either (A) the inner and outer gates cannot rotate relative to the container, but the chamber member can rotate relative to them, or (B) the chamber member cannot rotate relative to the container, but the inner and outer gates can rotate relative to the chamber member and the container. The first arrangement (A) has the advantage that the operator's fingers are further away from the material being dispensed.

In order to secure the device to the container, the device preferably comprises a mounting member which can be secured to the container, for example as described below.

When the device has been secured on top of the container, the following steps are preferably followed in order to operate the device.

The first step is to place the inner and outer gates in a position at which the outer gate is adjacent the non-dispensing chamber and the inner gate is adjacent the first of the dispensing chambers (including the possibility that, if the inner gate is large enough to extend over the first two dispensing chambers, the inner gate is adjacent first two dispensing chambers). This position is sometimes referred to herein as the Starting Position. While the devices at the Starting Position, the container is inverted so that the device is below the container. If the container is inverted at the Starting Position, the dispensing chamber (or chambers) adjacent to (and now underneath) the inner gate is (or are) filled. The device is now ready for use.

Relative rotation of the (i) chamber member and (ii) the inner and outer gates brings the dispensing aperture underneath the first of the dispensing chambers, which is already filled and which is in consequence dispensed. The rotation also causes the filling aperture to be placed over one or more of the dispensing chambers, which are, therefore, filled, but not dispensed. If the operator wants to dispense only the contents of the first chamber, the direction of rotation is reversed until the Starting Position is again reached. The chambers which have been placed under the filling aperture but not dispensed remain filled, and the chamber which has been dispensed is refilled.

If the operator wishes to dispense more than the first chamber, the rotation is continued. The other chambers fall successively under the filling aperture and are filled, and the desired number of chambers is dispensed as the offset dispensing aperture falls successively beneath them. If the operator wishes to dispense all the chambers, then the rotation is continued until all of the chambers have been first filled and subsequently dispensed. At this position, which can be termed the Finishing Position, the filling aperture is over the non-dispensing chamber and the dispensing aperture is underneath the last of the dispensing chambers.

Once the desired number of chambers has been dispensed, the device is rotated in the reverse direction until the device has been returned to the Starting Position. This will result in all the dispensing chambers which have been dispensed being refilled (none of them will be dispensed, because the dispensing aperture is always ahead of the filling aperture).

The device is now again ready to be used to dispense any desired number of the dispensing chambers.

In one embodiment of the invention, the device includes one or more stops which prevent rotation beyond the Starting Position after the device has been rotated so as to dispense all the chambers. In another embodiment, the device includes one or more stops which prevent rotation beyond the Finishing Position, after the device has been rotated so as to dispense all the chambers. Stops of this kind prevent any unwanted dispensing of previously filled chambers. For example, there can be a discontinuous circumferential groove which permits rotation only up to the Starting Position or only up to the Finishing Position when dispensing all the chambers, but permits rotation back again to refill all the chambers.

In one embodiment, the device includes a spring or similar mechanism such that, when the operator ceases the rotation which results in dispensing the desired number of chambers, automatically returns the device to the Starting Position. Such a spring mechanism could be combined with a stop as described above. In a similar but different embodiment, the device includes a spring or similar mechanism such that, when the device has been rotated to the Starting Position after dispensing all the chambers, or has been rotated to the Finishing Position after dispensing all the chambers, but not before, the device is automatically returned to the Starting Position as soon as the operator ceases the rotation towards the Finishing Position.

However, it is also possible for the device to be constructed so that it is possible to continue rotation past the Starting Position, after all the chambers have been dispensed, so that the device is ready for another use.

If for any reason the operator wishes to return the container to the upright position, while the device is in the Starting Position, the contents of the first dispensing chamber (or the first two dispensing chambers if the filling aperture extends over the first two dispensing chambers) will then be returned to the container through the filling aperture. If the operator wishes to return the contents of other chambers which are full, then the device can be rotated (after the container has been returned to the upright position) from the Starting Position to the Finishing Position, and this will return the contents of the chambers to the container.

As noted above, is important that the user should be able to identify the Starting Position. Identification of the Starting Position can be achieved by any means, e.g. visual and/or auditory and/or tactile and/or magnetic. In one embodiment, the outer gate is linked to a generally cylindrical component which has approximately the same diameter as the outer cylindrical wall of the chamber member, and the cylindrical component and the outer cylindrical wall have markings thereon to show the Starting Position and optionally to show the different positions for dispensing different chambers. Alternatively or additionally, at least some parts of the components of the device can be constructed of a material which is transparent or translucent, so that the user can observe directly whether any particular chamber is full or empty.

The invention includes the chamber member itself, whether or not it is incorporated into the device.

In a second aspect, this invention provides a container having a device according to the first aspect of the invention attached to it.

In a third aspect, this invention provides a method of dispensing material which comprises operating a device of the invention when it is fixed to a container containing the material to be dispensed.

In a fourth aspect, this invention provides a device for dispensing material which comprises a chamber member containing a plurality of chambers through which a material can be dispensed and a non-dispensing chamber which includes a desiccant.

BRIEF DESCRIPTION OF THE DRAWINGS

The invention is illustrated in the accompanying drawings, which are included by way of example only, and in which

FIGS. 2-9 show the spatial relationship, viewed from on top, between the filling aperture of the inner gate, the dispensing aperture of the outer gate, the dispensing chambers and the non-dispensing chamber, as the device shown in FIG. 1, when all the dispensing chambers are empty, is moved sequentially from (1) the Starting Position (FIG. 2) at which the filling aperture is above the first two-dispensing chambers (which are being filled) and the dispensing aperture is below the non-dispensing chamber (0°) to (2) the Finishing Position (FIG. 9) in which each of the dispensing chambers has been successively filled and dispensed. Each of the Figures shows whether the dispensing chambers are filling, full, empty or being dispensed.

FIG. 18 is an exploded view of a device of the invention which, in use, is secured to a container so that the chamber member cannot be rotated relative to the container and the device is operated by rotating the inner and outer gates; and FIG. 19 is an exploded view of another device of the invention which, in use, is secured to a container so that the chamber member cannot be rotated relative to the container and the device is operated by rotating the inner and outer gates.

DETAILED DESCRIPTION OF THE INVENTION

Figure 1:
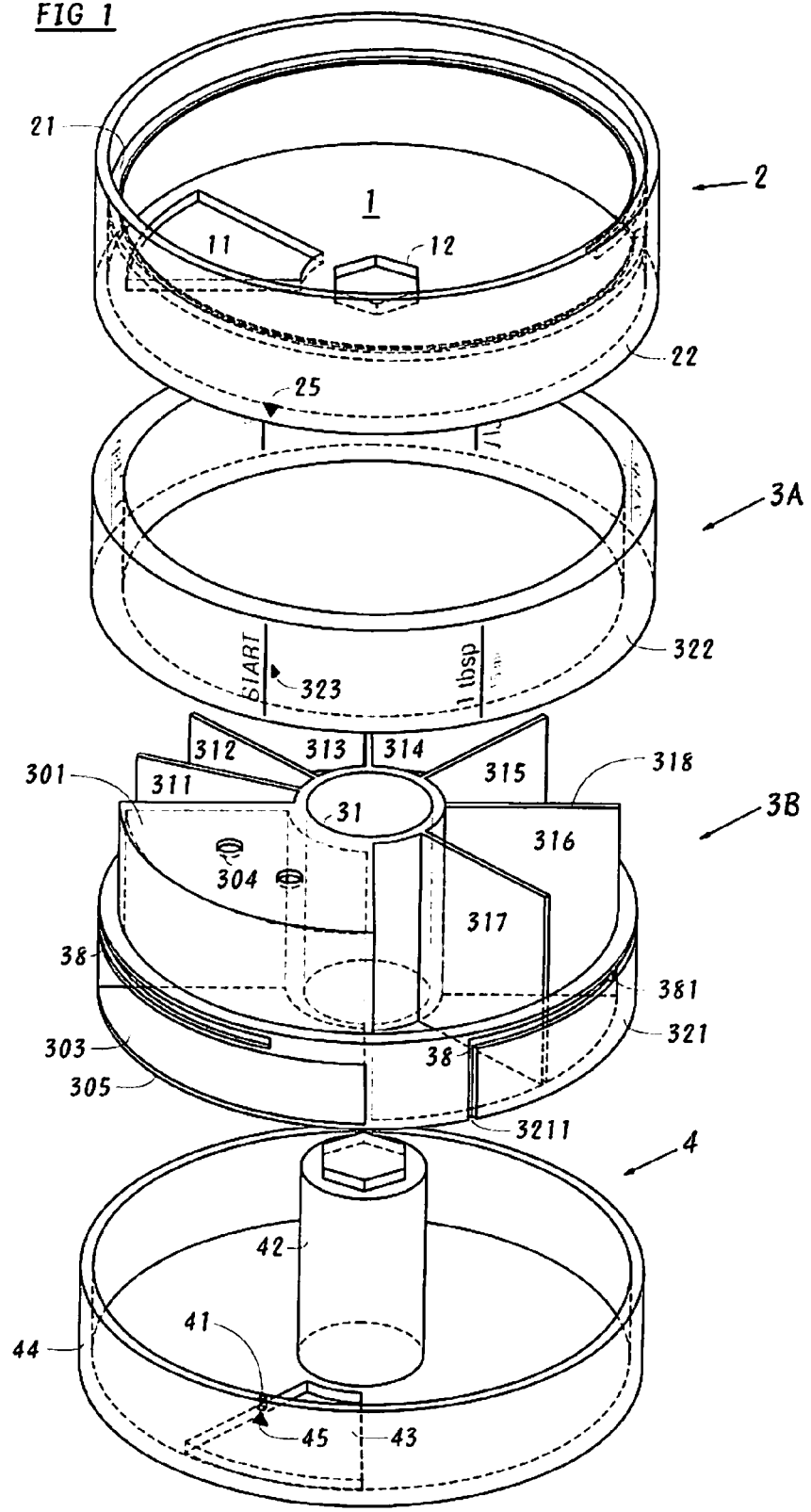
FIG. 1 is an exploded view of a device of the invention which, in use, is secured to a container so that the inner and outer gates are fixed in relation to the container, and the device is operated by rotating the chamber member.

In the Summary of the Invention above, in the Detailed Description of the Invention below, and in the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect or a particular embodiment, that feature can also be used in combination with other particular aspects and embodiments, and in the invention generally, except where the context excludes that possibility. The invention disclosed herein include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)–(a second number)", this means a range whose lower limit is the first number and whose upper limit is the second number. The terms "plural", "multiple", "plurality" and "multiplicity" are used herein to denote two or more than two features. Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function, except where the context excludes that possibility. The numbers given herein should be construed with the latitude appropriate to their context and expression; for example, each number is subject to variation which depends on the accuracy with which it can be measured by methods conventionally used by those skilled in the art.

If any element in a claim of this specification is considered to be, under the provisions of 35 USC 112, an element in a claim for combination which is expressed as a means or step for performing a specified function without the recital of structure, material, or acts in support of thereof, and is, therefore, construed to cover the corresponding structure, material, or acts described in the specification and equivalents thereof, then the corresponding structure, material, or acts in question include such structure, material, or acts described in the US patent documents incorporated by reference herein and the equivalents of such structure, material, or acts.

This specification incorporates by reference all documents referred to herein and all documents filed concurrently with this specification or filed previously in connection with this application, including but not limited to such documents which are open to public inspection with this specification.

The term "quadrant" is used herein to designate any volume which lies within a volume defined by a central core and a circumferential wall and which is at least in part defined by walls extending radially from the central core to the circumferential wall. Thus, the term "quadrant" is not used in the strict mathematical sense of a sector which occupies 90° of the area between the center point and the circumference of a circle. Where reference is made herein to the angle of a quadrant, it is the angle between the radial walls of the quadrant, when viewed from on top.

The Chamber Member.

The chamber member is preferably a generally cylindrical member which comprises (1) a vertical central member, (2) a vertical circumferential wall which surrounds and is separated from the central member, and which defines with the central member a generally cylindrical volume having an annular horizontal cross-section, the generally cylindrical volume comprising, and preferably consisting essentially of, (2A) a first part comprising a plurality of dispensing chambers (a) which lie within said volume, (b) which are separate from each other, (c) which are preferably adjacent to each other, (d) which lie in successive quadrants around the central member, and (e) each of which (i) is open at the top and at the bottom, and (ii) is defined by a plurality of generally vertical dispensing chamber wall members, at least some of the dispensing chamber wall members extending between the central member to the circumferential wall, and preferably being directly attached to the central member and/or to the circumferential wall, and (2B) a second part which comprises a non-dispensing chamber which (a) is defined by two generally vertical wall members extending between the central member and the circumferential wall and (b) has a laterally extending top.

The non-dispensing chamber optionally comprises a laterally extending base.

In one embodiment, the central member of the chamber member is hollow, and the device comprises a post which extends through the hollow central member and links the inner gate and the outer gate together so that rotation of one of the inner gate and the outer gate results in corresponding rotation of the other gate.

The wall members of the dispensing chambers and of the non-dispensing chamber can comprise (a) radial walls which extend radially all the way from the central member to the circumferential wall, and/or (b) radial walls which extend radially only part of the way between the central member and the circumferential wall. The dispensing chambers are at least partially defined by these radial walls. Preferably, except for the first and last dispensing chambers, each of the radial walls has one vertical surface which in part defines one of the chambers and an opposite vertical surface which in part defines an adjacent chamber. If some or all of the wall members are radial walls which extend radially only part of the way between the central member and the circumferential wall, the chamber wall members generally include one or more wall members which are generally at right angles to the radial wall members. One or more of the chamber wall members can be inclined to the vertical, for example at an angle of 10-30°, for example so that the area of the bottom of the chamber is less than the area at the top of the chamber.

The volume of each of the dispensing chambers is such that sequential dispensation of the material from two or more adjacent dispensing chambers results in dispensation of the desired total amount of the material. In some embodiments, each of the dispensing chambers has the same volume. In some other embodiments, the volume of the first dispensing chamber to be dispensed, or the volumes of each of the first two dispensing chambers to be dispensed are a fraction, for example half, of the volume of each of the remaining dispensing chambers. The operation of the device is manually controlled by the operator so that the material is dispensed from correct number of dispensing chambers.

Each of the dispensing chambers has a volume such that it can contain a desired and measured quantity of the material to be dispensed from the dispensing chamber when the dispensing aperture is placed beneath it. If, as is preferred, each of the dispensing chambers is defined by radial chamber walls extending from the central member to the circumferential wall, the volume of the dispensing chamber will be determined by the angle of the quadrant defined by the radial chamber walls and the height of the walls. If the angle is too small, there is a danger that the material will not be completely dispensed, and if the angle is too large, this limits the number of dispensing chambers, Preferably each of the dispensing chambers has an angle between the radial walls of at least 15°, particularly at least 20°. Preferably each of the dispensing chambers has an angle between the radial walls which is not greater than 60°, particularly not greater than 45°. The height of the wall members can be, for example, 0.4-0.9 inch, preferably 0.5-0.75 inch. If the height of the wall members is too large, it may be difficult to fill the dispensing chamber completely and/or to dispense it completely.

The number of dispensing chambers can vary widely, for example from 3 to 10, depending upon the desired number of increments in amount of material dispensed, and the amount of material in each increment. In a very simple case, there would be only three identical dispensing chambers, each having for example a capacity of half a teaspoon, and the device could be used to dispense the material either from only one of the dispensing chambers (e.g. half a teaspoon) or from two of the dispensing chambers (e.g. a teaspoon) or from all three of the dispensing chambers (e.g. 1½ teaspoons). In many useful embodiments of the invention, the number of dispensing chambers is 4-7, with each of the first and second of the chambers to be dispensed having a first volume, e.g. one quarter of a teaspoon, and the each of the remaining chambers having a volume which is twice the first volume, e.g. half a teaspoon. This permits the operator to dispense either very small or relatively very large quantities of the material.

The filling aperture of the inner gate is preferably a quadrant which extends substantially from the outer periphery of the inner gate to an inner periphery of the inner gate, so that material delivered through the filling aperture can fill the chamber or chambers beneath it. The dispensing aperture of the outer gate is preferably a quadrant which extends substantially from the outer periphery of the outer gate to an inner periphery of the outer gate, so that material in a previously-filled chamber can be dispensed through the dispensing aperture. The offset between the filling and dispensing apertures must be such that there is no possibility that the dispensing aperture is underneath a chamber which is being filled. For example, the included angle between the apertures can be 30-60°, e.g. about 45°.

The angular relationship between the filling aperture and the dispensing aperture (which angular relationship is fixed) and the angular relationship between the dispensing chambers and the filling and dispensing apertures (which angular relationship changes as the chamber member is rotated relative to the inner and outer gates) must be such that the device can be operated as desired. The device preferably has exterior markings and/or additional means to enable the operator to know the position of the filling and dispensing apertures relative to the dispensing chambers. Such additional means can for example be auditory and/or tactile and/or visual. For example, one of the relatively rotating components includes a detent and the other component includes a series of corresponding indentations, and there are corresponding markings on the exterior of the device, so that the user knows how much of the material has been dispensed for a given rotation. It is also possible for part or all of the exterior walls of the dispensing chambers to be transparent or translucent, so that the user can observe the presence or absence of material in the dispensing chamber.

in some embodiments of the invention, the angle of the quadrant of the filling aperture of the inner gate, (2) the angle of the quadrant of the dispensing aperture of the outer gate, (3) the angle of the quadrant of each of the chambers, or if the chambers are different sizes, the angle of the quadrant of the largest chamber, (4) the offset angle between the filling aperture and the dispensing aperture, (5) the angle between the starting position and the first sequential chamber, and (6) the angle between the start position and the last position, are all the same. In other embodiments, these angles are not the same, and the following conditions are met (1) the offset angle between adjacent walls of the filling aperture and the dispensing aperture are equal to or greater than the angle of the quadrant of the largest chamber, (2) the angle of the quadrant of the dispensing aperture is equal to or smaller than the angle of the quadrant of the largest chamber, (3) in the Starting Position, the filling aperture is above the first sequential chamber, and (4) in the Final Position, the filling aperture is not above any of the chambers.

For dispensing chambers of practical size, the greater the number of dispensing chambers, the larger the angle of the quadrant (viewed from on top) in which they lie. For example, when there are 6-7 dispensing chambers, all the dispensing chambers taken together, when viewed from on top, preferably lie in a quadrant which extends from the central core to the circumferential wall and which has an included angle which is at most 290°, preferably at most 270°. When there are 4-5 dispensing chambers, all the dispensing chambers taken together, when viewed from on top, preferably lie in a quadrant which extends from the central core to the circumferential wall and which has an included angle of at most 240°, and which may be at most 180°.

In a first embodiment, a first chamber lies in a 22.5° quadrant, a second chamber occupies the next 22.5°, a third chamber occupies the next 45°, a fourth chamber occupies the next 45°, a fifth chamber occupies the next 45°, a sixth chamber occupies the next 45°, and a seventh and final chamber occupies the next 45°. The non-dispensing chamber then occupies the remaining 90°. If the first and second chambers have a capacity of quarter of a teaspoon, and the third, fourth, fifth, sixth and seventh chambers have a capacity of half a teaspoon, then the operator can dispense, by relative successive rotation of the outer gate and the chamber member, quarter of a teaspoon, half a teaspoon, 1 teaspoon, 1½ teaspoons (i.e. ½ tablespoon), 2 teaspoons, 2½ teaspoons, and 3 teaspoons (i.e. 1 tablespoon).

In a second embodiment, a first chamber lies in a 30° quadrant, a second chamber occupies the next 30°, a third chamber occupies the next 60°, and a fourth chamber occupies the next 60°. If each of the first and second chambers has a capacity of quarter of a teaspoon, and each of the third and fourth chambers the third chamber has a capacity of half a teaspoon, the operator can dispense, by successive rotation of the outer gate relative to the chamber member, quarter of a teaspoon, half a teaspoon, 1 teaspoon, and 1½ teaspoons.

When the device is in use, it must be attached to the container containing the material to be dispensed, in such a way that there is (A) a fixed angular relationship between (i) the container and (ii) the upper and outer gates (in which case the device is operated by rotating the chamber member, or (B) a fixed angular relationship between (i) the container and (ii) the chamber member (in which case the device is operated by rotating the inner and outer gates).

When there is a fixed angular relationship between the container and the inner and outer gates, this can conveniently be achieved by making use of a mounting member to which the inner gate (and therefore also the outer gate) is secured. When the mounting member is secured to the container, this immobilizes the inner and outer gates. The mounting member can for example have an internal screw thread or another fitting, e.g. a push and/or snap fitting, which can be secured to the container and which, when secured to the container, immobilizes the inner and outer gates. For example, the container can have an external screw thread which is screwed into, and to the end of, an internal screw thread on the mounting member, without contacting the chamber member. The device is operated by rotating the chamber member. One example of such a device is shown in FIG. 1.

When there is a fixed angular relationship between the container and the chamber member, this can conveniently be achieved by making use of a device which has a mounting member having an internal screw thread or another fitting, e.g. a push and/or snap fitting, which can be secured to the container and which, when secured to the container, immobilizes the inner and outer gates. For example, the container can have an external screw thread which is screwed down into an internal screw thread on the mounting member until the container bears against the inner gate. The device is operated by rotating the inner and outer gates. One example of such a device is shown in FIG. 18.

The invention can make use of an auxiliary mounting member which fits between the mounting member and a container to which the mounting member itself cannot be secured. The auxiliary mounting member could for example be a fitting having a lower section which is screwed onto or otherwise secured to the mounting member of the device of the invention and an upper section, for example having a different diameter, which is screwed onto or otherwise secured to the container for the material to be dispensed.

When the non-dispensing chamber member has, in addition to its laterally extending top, a laterally extending base, the resulting chamber can be used for an additional purpose.

In one embodiment, the non-dispensing chamber contains a desiccant (e.g. silica gel or rice) and the top of the non-dispensing chamber has holes in it such that moisture can enter the space, but the material being dispensed cannot enter the non-dispensing chamber. In some embodiments, the non-dispensing chamber has an aperture on its side wall so that the desiccant can be replaced.

In some embodiments of the invention, it is possible to deliver a very small ("sifting") quantity of the material from the first sequential chamber by positioning the dispensing aperture underneath a small angular part of the first sequential chamber. In other embodiments it is possible for the chamber member to include a separate sifting chamber from which a very small quantity of material can be delivered, either because the sifting chamber is very small, or because the sifting chamber has a small orifice on a sidewall or on the bottom.

The chamber member can be a single monolithic component, or can be made up of two or more members which are secured to each other in the operating device. For example, there can be an upper member which comprises an upper part of the circumferential wall and a lower member which comprises the remainder of the circumferential wall. This can simplify manufacture. Another advantage is that the upper and lower members can be made of different polymeric compositions. For example, the lower member can be composed of a black polymeric composition, for example a polycarbonate or ABS polymer, and the upper member can be made of a transparent or semitransparent polymer, for example a tinted polyacrylate, thus permitting the operator to view the filling and dispensing of the material from the dispensing chambers.

The Inner Gate, the Outer Gate, and the Connection Between them.

The inner gate can comprise a horizontal disk from which a section has been removed to provide the filling aperture. For example, the section which has been removed can be part or all of a quadrant of the disk having an angle which is at least as large as the largest of the angles of the dispensing chambers, for example 45-120°, e.g. 45-60°.

The outer gate of the device can be a horizontal disk from which a section has been removed to provide the dispensing aperture. For example, the section which has been removed can be part or all of a quadrant of the disk having an angle which is no larger than the largest angle of any of the dispensing chambers, for example no more than 60°, e.g. 45°. It may be noted that, since the chambers are sequentially dispensed, it is possible, if the dispensing aperture has an angle which is equal to the sum of the angles of the first and second chambers, for material to be dispensed (1) only from a very small part of the first of the chambers (for "sifting"), (2) only from the first of the chambers, or (3) simultaneously from the first and second chambers. The area of the dispensing aperture preferably corresponds to the largest of the separate chambers of the chamber member, though it can be smaller providing that it is sufficiently large that the largest chamber can be dispensed from it.

When the device is in operation, the inner gate and the outer gate must be linked to each other so that they move together. One convenient way of achieving this result is by means of a post which passes through the center of the chamber member and is connected to the center of the inner gate and to the center of the outer gate. The connection of the post to one or both of the gates can be permanent, or at least one of the connections can be disassembled. This enables the device to be taken apart to be cleaned. In one embodiment, either or both of the inner and outer gates has a central orifice which fits over the end of the post, and the end (or each end) of the post and the corresponding central orifice have shapes (for example, a circle having a segment removed from it) which ensure the desired unique positioning of the inner and outer gates. In another embodiment, the underside of the inner gate and/or the upper side of the outer gate has a screw fitting attached to its center and the post has a corresponding screw fitting; in that case, there are preferably markings on the components to ensure that they are correctly assembled.

Operation of the Device.

Operation of the device requires the operator (or when the device is in use as part of an automated dispensing process, the control system) to have knowledge of the relative positions of (a) the chamber member and (b) the inner gate and the outer gate (which are linked together). This can be accomplished in any convenient way, for example as described above.

Preferably, the outer gate and/or the inner gate comprises an outer circumferential wall which interacts with the exterior of the circumferential wall of the chamber member to indicate to the operator of the device the relative positions of (a) the chamber member and (b) the inner gate and the outer gate (which are linked together). The indication can be auditory and/or tactile and/or visual. In one embodiment, one of the circumferential walls has a detent, and the other of the circumferential walls has indentations similarly spaced around it, so that the operator knows when a particular position has been reached. The detents and indentations should be such that the operator can continue the rotation to complete the desired filling or dispensing of the material; preferably the device generates a click which the operator can hear when a particular position has been reached. Preferably the components of the device include circumferential walls which are marked to inform the operator of the device of the relative positions of the chamber member and the inner and outer gates. Alternatively or additionally, magnets can be spaced around the circumferential walls so that there is a magnetic attraction between them at the desired intervals of the rotation.

The Drawings.

FIG. 1 is an exploded view of one example of a device of the invention which, in use, is secured to a container so that the inner and outer gates cannot be rotated relative to the container and the device is operated by rotating the chamber member.

The inner gate 1 is a horizontal disk having a filling aperture in the form of a quadrant 11 removed from it. At the center of the horizontal disk there is a hexagonal aperture which, as described later, fits over a corresponding hexagonal section of a post which extends upwards from the lower gate 4. As shown in FIG. 1, the inner gate 1 is secured permanently to the mounting member 2 so that, when the mounting member is screwed onto or otherwise secured to a container, the inner gate is immobilized in relation to the container. For ease of manufacture, and/or to enable the mounting member and the inner gate 1 to be composed of different materials, the mounting member and the inner gate 1 can optionally be prepared separately.

The outer gate 4 comprises a vertical circumferential wall 44, and a horizontal base having a dispensing aperture in the form of a quadrant 43 removed from the horizontal base, and a vertical post 42 which extends upwards from the center of the horizontal base and through the chamber member. The top of the post 42 has a hexagonal section which fits into the hexagonal aperture in the inner gate 1 to ensure the correct angular relationship between the filling aperture 11 and the dispensing aperture 43.

The chamber member 3 comprises an upper section 3A and a lower section 3B. The lower section 3B comprises a central core 31 which is an open cylinder, a circumferential wall 321 and a plurality of separate chambers 311-317 which extend radially from the central core 31. The upper section 3A comprises a circumferential wall 322 which fits over the dispensing chambers and onto the top of the circumferential wall 321. As shown, the upper section 3A is prepared separately from the lower section 3B, and is made of a material different from the lower section 3B, for example a clear or translucent polymeric composition, e.g. an acrylic polymer composition, so that the operator can observe material in the dispensing chambers. Alternatively, the two sections 3A and 3B can be prepared as a single unit. In an operating device, the sections 3A and 3B are secured together The exterior of the circumferential wall 322 carries markings which enable the operator of the device to visually identify the Starting Point and/or other relative positions of the dispensing chambers and the filling and dispensing apertures. Alternatively or additionally, the outer surface of one or both of the circumferential walls can carry non-visual means for identifying the relative positions of the dispensing chambers and the filling and dispensing apertures. It is also possible for one or both of the circumferential walls to carry projections and/or indentations to assist the operator of the device in positioning the upper and lower gates relative to the chamber member.

The lower circumferential wall 321 has a vertical groove 3211 and a communicating circumferential groove 38 which extends around most, but not all, of the circumference of the wall 321. On the interior of the circumferential wall 321, there is a short vertical guide member 41 at a position which is marked on the exterior of the circumferential wall by marker 45.

When the outer gate is to be fitted to the chamber member, the guide member 41 is pushed up the groove 3211 until it is in communication with the circumferential groove 38. When the guide member 41 reaches the end of the groove 3211, it fits within one end of the circumferential groove 38, and can be rotated around the circumferential wall 321 until it reaches the end of the groove 38, but no further. This brings the top of the post 42 into a position just above the top of the hollow central core 31.

The chambers 311-317 are defined by the central core 31, the circumferential wall 322, and chamber walls 303, 311 etc. which extend radially from the central core 31. Chambers 311-317 are open at the top and bottom.

Chamber member 3 includes a non-dispensing chamber which is formed by a laterally extending top member 301, a laterally extending base member (not shown in the drawing), part of the circumferential walls 321 and 322, part of the central core 31, and radial walls which also partly define the chambers 311 and 317. There are vent holes 304 in the top member 301. Chamber 303 can optionally serve as a receptacle for a desiccant, e.g. a silica gel package or rice, to which moisture has access through the vent holes 304. If desired, the non-dispensing chamber can comprise an opening 305 in its side wall through which desiccant can be inserted, and if necessary replaced.

Assembly of the device shown in FIG. 1 is completed by fitting the upper section 3A over the lower section 3B and securing the two together, and securing the hexagonal aperture of the upper gate 1 to the hexagonal upper end of the post 42

FIGS. 2-9 show the spatial relationship, viewed from on top, of the dispensing aperture of the outer gate, the filling aperture of the inner gate and the chambers of the chamber member, when the device is below the container, as the device is being used for the first time in order to dispense all of the chambers. Each of the chambers is shaded differently to show whether it is empty, is being filled,—is full, or is being dispensed. FIG. 2 shows this relationship when the first two chambers are full and the other dispensing chambers are empty. FIGS. 3-9 show this relationship after the inner and outer gates have been rotated through angles of 67.5°, 90°, 135°, 180°, 225°, 270°, and 315°.

When the device is being used for the first time, the container is upright and the device is then mounted on top of the container. At this stage, all the dispensing chambers are empty. If the container is turned upside down, with the chamber member at the Starting Position, the first two dispensing chambers (31, 32) are filled, and no material is dispensed, as shown in FIG. 2.

After rotating the inner and outer gates through 67.5°, the filling aperture is partially over dispensing chamber 33 and partially over dispensing chamber 34, and as a result, both chambers 33 and 34 are filled; and the dispensing aperture is below chamber 31 so that material is dispensed from chamber 31, as shown in FIG. 3.

As shown in FIG. 4, after rotating through 90°, the filling aperture is over the chamber 34 which is already full. The dispensing aperture is below the chamber 32, which is dispensed:—

As shown in FIG. 5, after rotating through 135°, the filling aperture is over the chamber 35, and the chamber 35 is filled. The dispensing aperture is below the chamber 33, which is dispensed.

Figure 6:
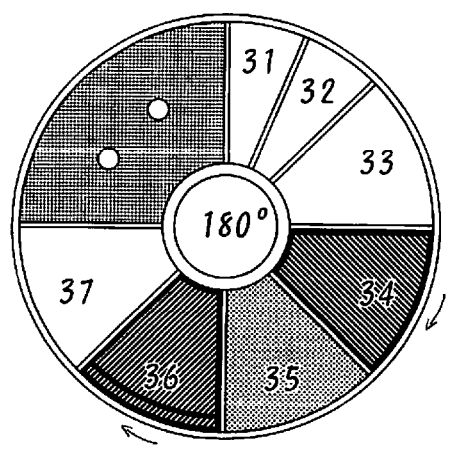

As shown in FIG. 6, after rotating through 180°, the filling aperture is over the chamber 36, and the chamber filled. The dispensing aperture is below the chamber 34, which is dispensed.

Figure 7:
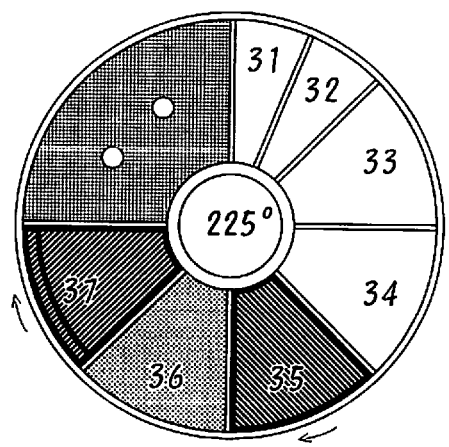

As shown in FIG. 7, after rotating through 225°, the filling aperture is over the chamber 37, and the chamber 37 is filled. The dispensing aperture is below chamber 35, which is dispensed.

Figure 8:
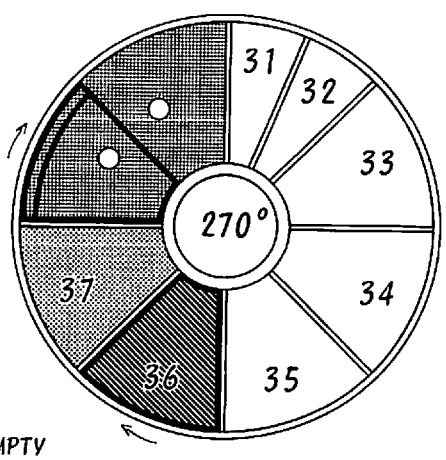

As shown in FIG. 8, after rotating through 270°, the filling aperture is over the non-dispensing chamber, and the dispensing aperture is below chamber 36, which is dispensed.

Figure 9:
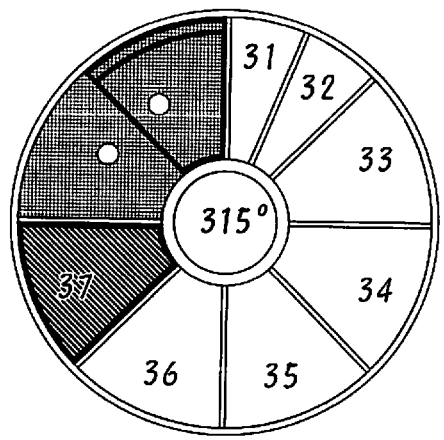

As shown in FIG. 9, after rotating through 315°, the filling aperture is over the non-dispensing chamber, and the dispensing aperture is below chamber 37, which is dispensed.

FIGS. 10-17 show the spatial relationship, viewed from on top, of the dispensing aperture of the outer gate, the filling aperture of the inner gate and the chambers of the chamber member, when the device is below the container, as the dispensing chambers are refilled as the chamber member is rotated from the Final Position to the Starting Position. Similarly as in FIGS. 2-9, each of the chambers is shaded differently to show whether it is empty, or is being filled, or has been filled.

Figure 10:
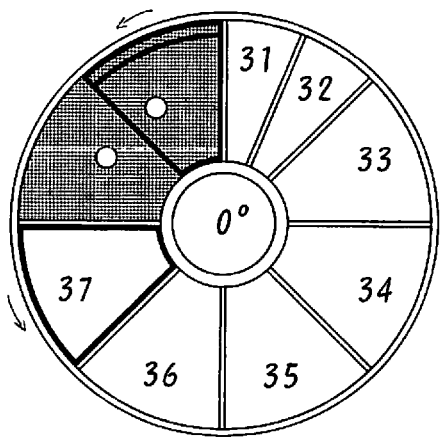
FIGS. 10-17 show the spatial relationship, viewed from on top, between the filling aperture of the inner gate, the dispensing aperture of the outer gate, the dispensing chambers and the non-dispensing chamber, as the device shown in FIG. 1, after all the dispensing chambers have been dispensed by following the sequence shown in FIGS. 2-9, is rotated sequentially from (1) the completely empty Finishing Position shown in FIG. 10 to the fully loaded Starting Position shown in FIG. 17. Each of the Figures shows whether the dispensing chambers are empty, being filled, or full.

FIG. 10 is the same as FIG. 9, except that chamber 37 is empty and the indication of the direction of rotation is reversed.

Figure 11:
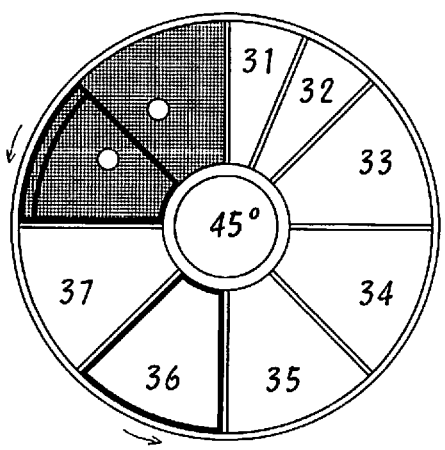

As shown in FIG. 11, after rotating through 45° (in the direction opposite to the rotation in FIGS. 2-9), the inner filling aperture is still over the non-dispensing chamber, and the dispensing aperture is under the chamber 35, which is empty, so nothing is dispensed.

Figure 12:
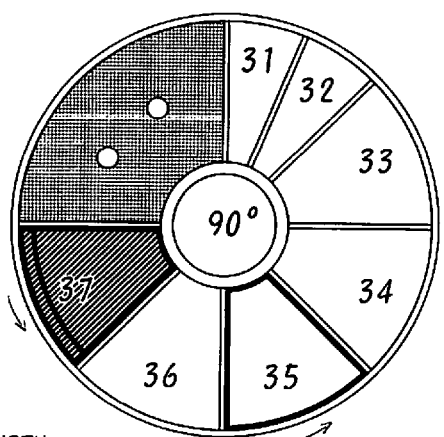

As shown in FIG. 12, after rotating through 90°, the filling aperture is over the chamber 37, which is filled, and the dispensing aperture is under the chamber 35, which is empty, so nothing is dispensed.

Figure 13:
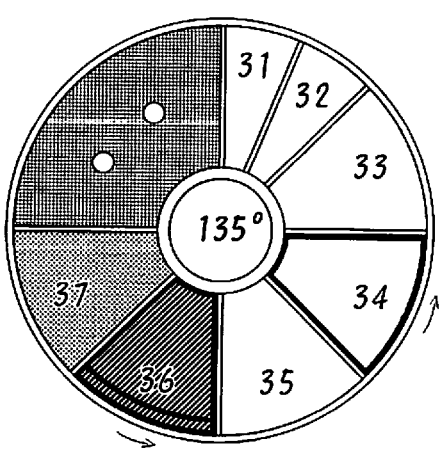

As shown in FIG. 13, after rotating through 135°, the filling aperture is over the chamber 36, which is filled, and the dispensing aperture is under the chamber 34, which is empty, so nothing is dispensed.

Figure 14:
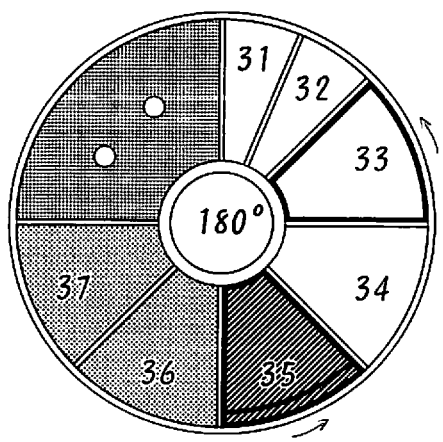

As shown in FIG. 14, after rotating through 180°, the filling aperture is over the chamber 35, which is filled, and the dispensing aperture is under the chamber 33, which is empty, so nothing is dispensed.

Figure 15:
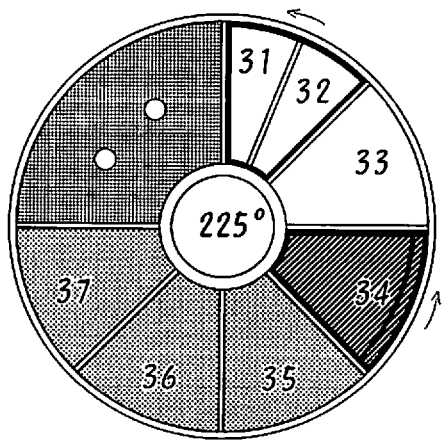

As shown in FIG. 15, after rotating through 225°, the filling aperture is over the chamber 34, which is filled, and the dispensing aperture is under the chambers 31 and 32, which are empty, so nothing is dispensed.

Figure 16:
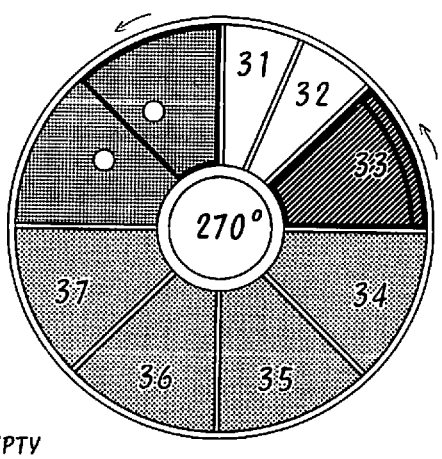

As shown in FIG. 16, after rotating through 270°, the filling aperture is over the chamber 33, which is filled, and the dispensing aperture is under the non-dispensing chamber 35, so nothing is dispensed.

Figure 17:
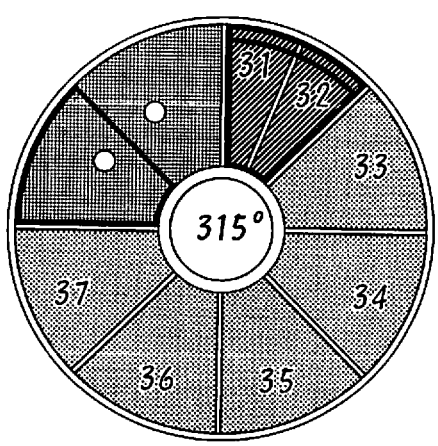

As shown in FIG. 17, after rotating through filling aperture is over the chambers 31 and 32, which are filled, and the dispensing aperture is still under the non-dispensing chamber, so nothing is dispensed.

FIG. 18 shows an example of a device of the invention which, in use, is secured to a container so that the chamber member cannot be rotated relative to the container and the device is operated by rotating the inner and outer gates.

The device comprises an inner gate 1, a circumferential mounting member 2, a chamber member 3, an outer gate 4, and a post 42 secured to the center of the outer gate 4. These components are secured together in an operating device, as further described below. The mounting member 2 may be secured permanently to the chamber member 3. However, for ease of manufacture, and/or to enable the mounting member and the chamber member to be composed of different materials, the mounting member and the chamber member can be prepared separately. The inner gate and the outer gate can be secured to the combination of the mounting member and the chamber member in a way which enables them to be separated, so that the device can be taken apart for cleaning. The mounting member, if not permanently secured to the chamber member 3, can be secured to it so that it can be disassembled from the other components The outer gate 4 comprises a vertical circumferential wall 44, and a horizontal base having a dispensing aperture in the form of a quadrant 43 removed from the horizontal base, and a vertical post 42 which extends upwards from the center of the horizontal base. The top of the post 42 has a depression in it, the depression having the shape of a part of a circle. On the interior of the circumferential wall 44, there is a short vertical guide member 41 at a position which is marked on the exterior of the circumferential wall by marker 45. The interior of the circumferential wall 44 optionally has indentations which are spaced around the circumferential wall at positions which correspond to the dispensing and/or filling of the chambers, and which cooperate with detents 38 on the exterior of the circumferential wall 321 of the chamber member, as further described below. Post 42 is attached to the base of the outer gate 4, extends through the chamber member 3 and in the operating device is attached to the inner gate 1.

The inner gate 1 is a horizontal disk having a filling aperture in the form of a quadrant 11 removed from it. On the underside of the horizontal disk there is a short central post 12 having a cross-section which is a part of a circle and which fits into the depression in the top of the post 42 and thus ensures that there is the desired angular relationship between the filling aperture 11 and the dispensing aperture 43.

The chamber member 3 comprises a central core 31 which is an open cylinder, a circumferential wall 321 and a plurality of separate chambers 311-317 which extend radially from the central core 31. The circumferential wall 32 has a lower section 321 having a first outer diameter and an upper section 322 having a second, greater diameter. The lower section 321 has a vertical groove 3211. When the outer gate is to be fitted to the chamber member, the guide member 41 is pushed up the groove 3211 until it is flush with the upper section 322. The guide member is then above the groove 3211, and fits into an incomplete circumferential groove 38 at the top of the lower section 321. The guide member is then rotated until the marker 45 is aligned with the marker 25 on the outside the mounting member 2. This ensures that the outer gate 4 is installed in the correct angular relationship to the chambers in the chamber member 3. As in FIG. 1, the incomplete circumferential groove 38 ensures that, after the chamber member has been rotated in order to fill the dispensing chambers, it cannot be rotated further to a position in which a filled dispensing chamber is inadvertently emptied.

The exterior surface of the lower section has detents which are spaced around its circumference at positions which correspond to the indentations 48 on the interior surface of the circumferential wall 44, i.e. at points corresponding to the dispensing and/or filling of the chambers 311-317. The post 42 of the outer gate passes through the central core 31 of the chamber member, so that the chamber member 10 can rotate around the post 42

The mounting member 2 can optionally be prepared separately from the chamber member 3, but in an operating device fits over the chamber member 3, and is secured to the top of the circumferential wall 32 of the chamber member 3. The mounting member 2 extends upwards from the chamber member 3, and at the top has an internal screw thread 21 which can be used to secure the device to a container having a corresponding external screw thread. The bottom section of the mounting member 2 comprises a circumferential wall 22 which fits to and is secured to the top of the circumferential wall 32 of the chamber member 3. Spaced around the exterior of the base of the mounting member are the new markings which correspond to the points at which the chambers 311-317 are filled or dispensed.

The chambers 311-317 are defined by the central core 31, the circumferential walls 32 and 22, and chamber walls 38 which extend radially from the central core 31. Chambers 311-317 are open at the top and bottom.

Chamber member 3 includes a non-dispensing chamber 303 which is formed by a laterally extending top member 301, a laterally extending base member (not shown in the drawing), part of the circumferential walls 22 and 32, part of the central core 31, and radial walls which also partly define the chambers 311 and 317. There are vent holes 304 in the top member 301, and an opening 305 in the circumferential wall. Chamber 303 serves as a receptacle for a desiccant, e.g. a silica gel package or rice, to which moisture has access through the vent holes 304, and which can be replaced through the opening 305 when the outer gate 4 has been removed from the chamber member 3.

FIG. 19 shows another example of a device of the invention which, in use, is secured to a container so that the chamber member cannot be rotated relative to the container and the device is operated by rotating the inner and outer gates.

The device comprises an inner gate 91, an outer gate 92, a chamber member 93 and a post 94 to which the inner and outer gates are fixed. The inner gate 91 is a disk which has a quadrant 911 removed from it to provide the filling aperture and which also has a central aperture 912 which is fixed to the post 94. The chamber member 93 has a plurality of separate dispensing chambers 931 which are defined by chamber walls 9311 which extend radially from a central core 932 which is an open cylinder and through which passes the post 94. The chamber member 93 has a circumferential wall 933 having detents 9331 on its exterior surface. The outer gate 92 comprises a dispensing aperture 921 and a circumferential wall 923 having indentations 9231 on its inner surface which cooperate with the detents 9331 on the chamber member. The upper section of the circumferential wall 933 has screw threads 332 so that the chamber member can be screwed onto a container. Post 94 is attached to the base of the outer gate 92.

The invention claimed is:

1. A cylindrical chamber member which is suitable for use in a device for dispensing material and which comprises
   (A) an outer circumferential wall,
   (B) a hollow central member, and
   (C) a plurality of chamber walls which extend between the central member and the outer circumferential wall and define successive quadrants around the central member, there being (i) at least three quadrants which are adjacent to each other and each occupied by a separate dispensing chamber which has an open top and an open base, and (ii) a single quadrant occupied by a non-dispensing chamber which has an upper surface such that the material to be dispensed cannot be placed in the non-dispensing chamber and which has a closed lower surface.

2. A chamber member according to claim 1 wherein the dispensing chambers include a first dispensing chamber having a first volume and at least one other dispensing chamber having a second volume which is twice the first volume.

3. A chamber member according to claim 1 which comprises (a) a first dispensing chamber having a first volume, (b) a second dispensing chamber adjacent to the first dispensing chamber and has a second volume equal to the first volume, and (c) 2 to 5 other dispensing chambers, each of which has a volume which is twice the first volume.

4. A device for dispensing material, the device comprising
   (1) an inner gate in the form of a disk, the disk having a circular cross section having a center and containing a filling aperture,
   (2) an outer gate
      (i) below the inner gate,
      (ii) in the form of a disc, the disk having a circular cross section having a center below the center of the inner gate,
      (iii) contains a dispensing aperture which is offset from the filling aperture of the inner gate, and
      (iv) is linked to the inner gate so that movement of one of the inner gate and the outer gate results in corresponding movement of the other gate, and
   (3) a cylindrical chamber member according to claim 1 which lies between the inner gate and the outer gate;
   the inner gate and the outer gate being movable in relation to the chamber member, either by moving the chamber member in relation to the inner gate and the outer gate or by moving the inner gate and the outer gate in relation to the chamber member, between
      (a) a starting position at which the filling aperture is aligned above a first dispensing chamber and the dispensing aperture of the outer gate is aligned below the non-dispensing chamber,
      (b) a succession of filling positions in each of which the filling aperture of the inner gate is aligned above one or more of the dispensing chambers and the dispensing aperture of the outer gate is not aligned below the one or more of the dispensing chambers, and
      (c) a succession of dispensing positions in each of which the filling aperture is not aligned above any of the dispensing chambers, and the dispensing aperture of the outer gate is successively aligned below one of the dispensing chambers.

5. A device according to claim 4 wherein each of the dispensing chambers has the same volume and the number of dispensing chambers is from 4 to 7.

6. A device according to claim 4 which comprises (a) a first dispensing chamber having a first volume, (b) a second dispensing chamber adjacent to the first dispensing chamber and has a second volume equal to the first volume, and (c) 2 to 5 other dispensing chambers, each of which has a volume which is twice the first volume.

7. A device according to claim 4 which comprises a mounting member which can be secured to a container containing material to be dispensed by the device, the device being configured so that, when secured to the container, the inner and outer gates are fixed relative to the container.

8. A device according to claim 4 which comprises a mounting member which can be secured to a container containing material to be dispensed by the device, the device being configured so that, when it is secured to the container, the chamber member is fixed relative to the container.

9. A device according to claim 4 which comprises means for identifying when the device is in the starting position at which the filling aperture is above the first dispensing chamber and the outer gate is adjacent the non-dispensing chamber.

10. A device according to claim 9 wherein the means for identifying when the device is in the starting position comprises visual markings.

11. A device according to claim 9 wherein the device includes a stop which prevents rotation of (i) the chamber member and (ii) the inner and outer gates through the starting position.

12. A cylindrical chamber member which is suitable for use in a device for dispensing material and which comprises
    (A) an outer circumferential wall,
    (B) a hollow central member, and
    (C) a plurality of chamber walls which extend between the central member and the outer circumferential wall and define successive quadrants around the central member, there being (i) at least three quadrants adjacent to each other and each occupied by a separate dispensing chamber which has an open top and an open base, and (ii) a single quadrant occupied by a non-dispensing chamber which has an upper surface such that the material to be dispensed cannot be placed in the non-dispensing chamber and which contains a desiccant.

13. A device for dispensing material, the device comprising
    (1) an inner gate in the form of a disk, the disk having a circular cross section having a center and containing a filling aperture,
    (2) an outer gate
       (i) below the inner gate,
       (ii) in the form of a disc, the disk having a circular cross section having a center which is below the center of the inner gate, (iii) contains a dispensing aperture offset from the filling aperture of the inner gate, and
(iv) is linked to the inner gate so that movement of one of the inner gate and the outer gate results in corresponding movement of the other gate, and
(3) a cylindrical chamber member according to claim 12 which lies between the inner gate and the outer gate, the inner gate and the outer gate being movable in relation to the chamber member, either by moving the chamber member in relation to the inner gate and the outer gate or by moving the inner gate and the outer gate in relation to the chamber member, between
(a) a starting position at which the filling aperture is aligned above a first dispensing chamber and the dispensing aperture of the outer gate is aligned below the non-dispensing chamber,
(b) a succession of filling positions in each of which the filling aperture of the inner gate is aligned above one or more of the dispensing chambers and the dispensing aperture of the outer gate is not aligned below the one or more of the dispensing chambers, and
(c) a succession of dispensing positions in each of which the filling aperture is not aligned above any of the dispensing chambers, and the dispensing aperture of the outer gate is successively aligned below one of the dispensing chambers.

14. A device according to claim 13 which comprises a mounting member which can be secured to a container containing material to be dispensed by the device, the device being configured so that, when secured to the container, the inner and outer gates are fixed relative to the container.

15. A device according to claim 13 which comprises a mounting member which can be secured to a container containing material to be dispensed by the device, the device being configured so that, when it is secured to the container, the chamber member is fixed relative to the container.

16. A chamber member according to claim 12 which comprises (a) a first dispensing chamber having a first volume, (b) a second dispensing chamber which is adjacent to the first dispensing chamber and has a second volume equal to the first volume, and (c) 2 to 5 other dispensing chambers, each of which has a volume which is twice the first volume.

* * * * *